O. W. AHLGREN.
GARMENT HANGER WITH CHECK CONTROLLED AND COIN OPERATED MEANS.
APPLICATION FILED OCT. 16, 1918.
1,371,213.
Patented Mar. 15, 1921.
5 SHEETS—SHEET 4.
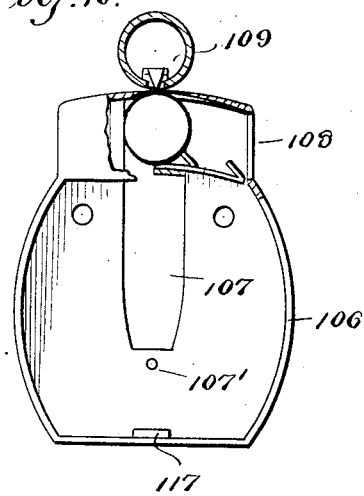
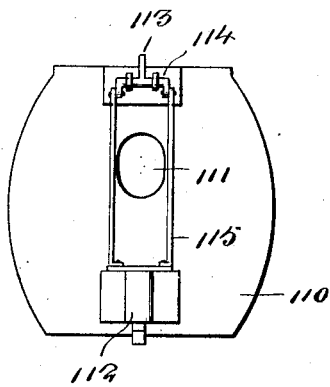
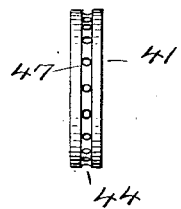
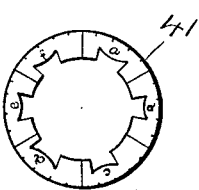
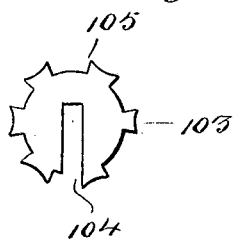
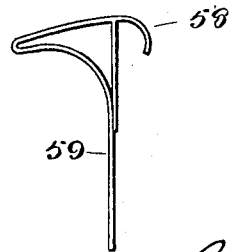
Inventor
O. W. Ahlgren
By Victor J. Evans
Attorney
Witnesses
E. R. Kupfert O. W. AHLGREN.
GARMENT HANGER WITH CHECK CONTROLLED AND COIN OPERATED MEANS.
APPLICATION FILED OCT. 16, 1918.
1,371,213. Patented Mar. 15, 1921.
5 SHEETS—SHEET 5.
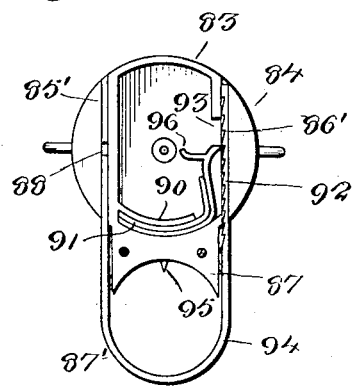
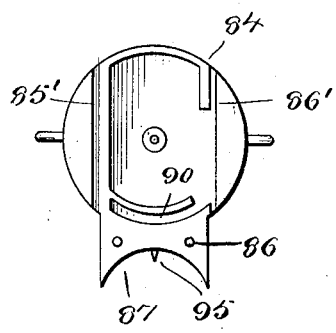
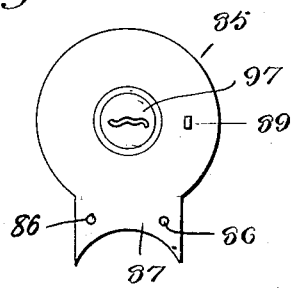
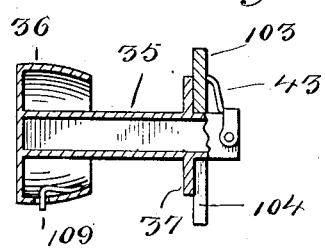
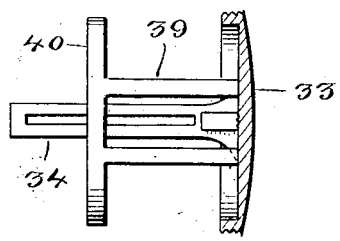
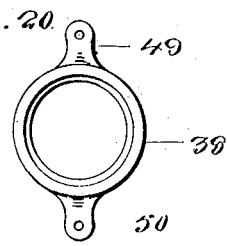
Witnesses
E. R. Ripput.
Inventor
O. W. Ahlgren
By Victor J. Evans
Attorney

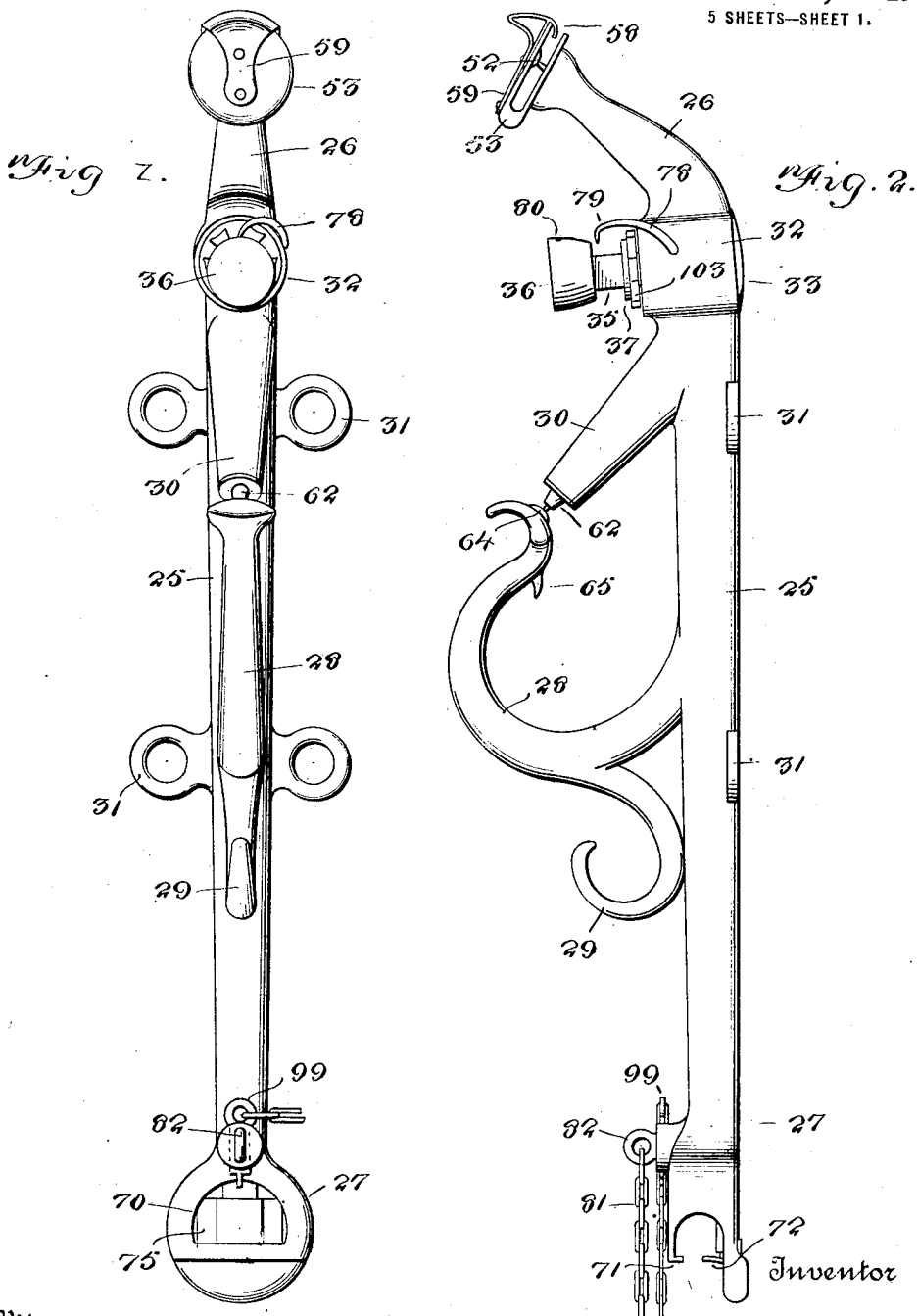

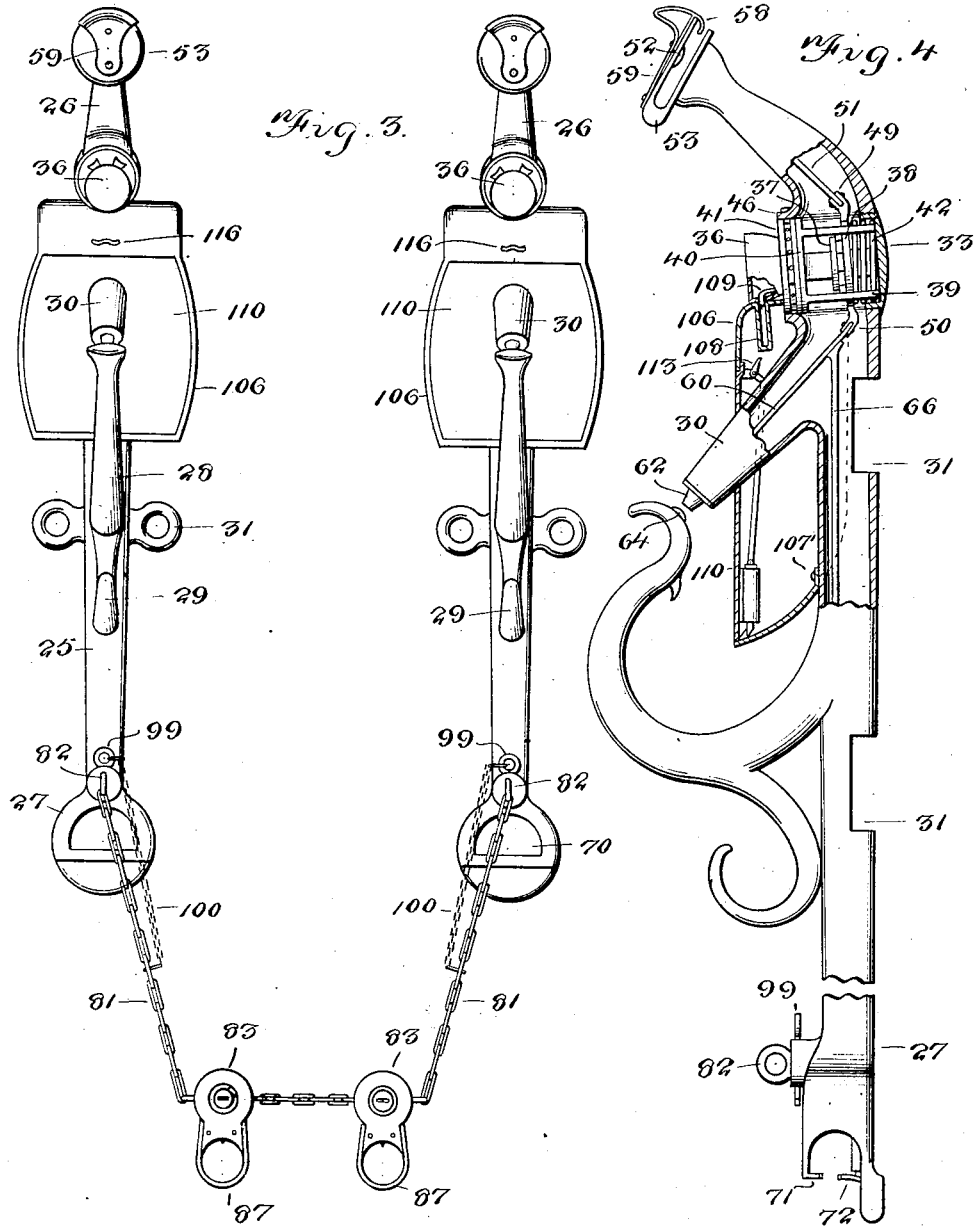

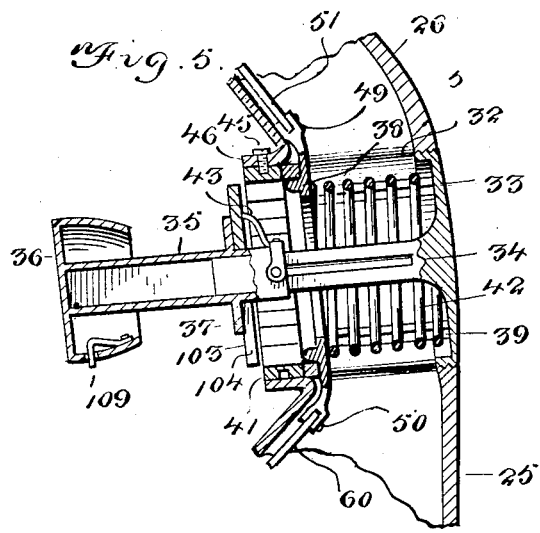
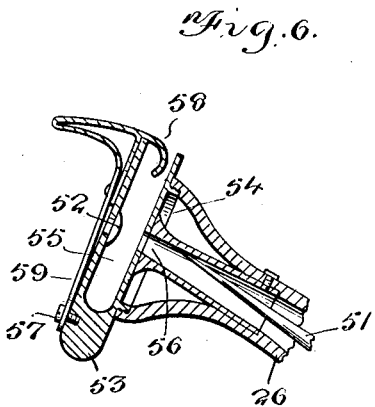
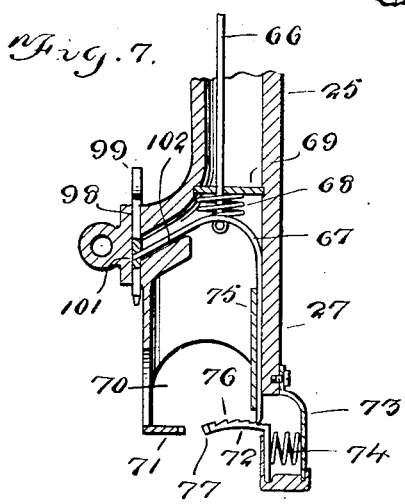
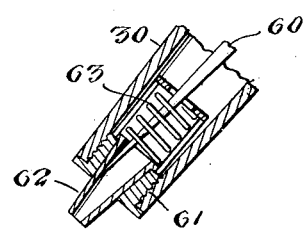
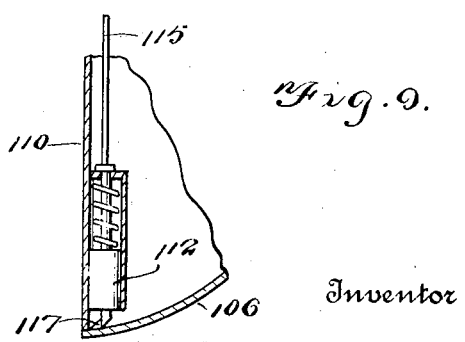

UNITED STATES PATENT OFFICE.

OSCAR W. AHLGREN, OF UTICA, NEW YORK, ASSIGNOR OF ONE-HALF TO D. A. HEIDT, OF UTICA, NEW YORK.

GARMENT-HANGER WITH CHECK-CONTROLLED AND COIN-OPERATED MEANS.

1,371,213.      Specification of Letters Patent.      Patented Mar. 15, 1921.

Application filed October 16, 1918. Serial No. 258,376.

*To all whom it may concern:*

Be it known that I, OSCAR W. AHLGREN, a citizen of the United States, residing at Utica, in the county of Oneida and State of New York, have invented new and useful Improvements in Garment-Hangers with Check-Controlled and Coin-Operated Means, of which the following is a specification.

The purpose of this invention is to provide a hanger which is attractive in appearance; which occupies comparatively small space and which is durable in construction, the device being admirably adapted for either general or public use.

The main object of the invention is the provision of a hanger by means of which various articles of wearing apparel such as hats, coats, umbrellas, canes and ladies' hand bags may be securely locked in such manner that the articles will be held in position to drain if wet, the device being simple to use and operate.

When using the device the customer or user is compelled to return the check in releasing the article and the check is retained within the hanger for the next patron, as is fully described hereinafter.

Another object is to provide means for delivering a check or disk at the time of locking the hanger, the said disk providing means whereby the locking mechanism may be released to permit of the removal of the articles from the hanger.

Another object is to provide means for setting the lock releasing means, so as to require a check or disk of special design for its operation.

A further object is to provide a coin attachment, by means of which the locking mechanism may be operated to secure articles upon the hanger and at the same time deliver the check or disk to be used in the releasing of the locking means.

With the above and other objects in view the invention consists of the following novel details of construction, combination and arrangement of parts to be hereinafter more fully described and illustrated in the accompanying drawings.

In the drawings:—

Figure 1 is a front elevation of a hanger constructed in accordance with the present invention;

Fig. 2 is a side elevation of the same;

Fig. 3 is a front elevation of the hanger equipped with the coin controlled means;

Fig. 4 is a side elevation of the same partly broken away illustrating a modified means for securing the hanger upon the support;

Fig. 5 is an enlarged sectional view illustrating the position of the operating plunger when the parts are in a locking position;

Fig. 6 is an enlarged sectional view of the hat securing arm;

Fig. 7 is a similar view of the hand bag securing means and a means for locking the key used for the operation of the umbrella or cane lock;

Fig. 8 is an enlarged sectional view of the end of the coat or cloak locking arm;

Fig. 9 is an enlarged detail sectional view of the coin receptacle lock;

Fig. 10 is a sectional elevation of the coin receptacle;

Fig. 11 is an elevation of the front plate of the coin receptacle;

Fig. 12 is a detail edge view of the ring for controlling the passage of the lock releasing check or disk;

Fig. 13 is a detail face view thereof;

Fig. 14 is a similar view of the check;

Fig. 15 is a detail sectional view of the umbrella or cane lock;

Fig. 16 is a detail view of one of the plates of the umbrella or cane lock;

Fig. 17 is a similar view of the other plate of this lock;

Fig. 18 is a detail sectional view of the operating plunger;

Fig. 19 is a detail view partly in section of the member to which the operating plunger is connected, the disk mounted upon the shank of this plunger being shown in position;

Fig. 20 is a detail view of the ring to which the locking pins are secured; and

Fig. 21 is a detail view of the hat arm engaging member.

Referring to the drawings in detail, there is illustrated a hanger which includes a standard 25, the said standard carrying at its upper end a forwardly projecting hollow arm 26 to which is adapted to be secured a hat in the manner to be later described. At its lower end the standard 25 is provided with an enlarged hollow portion 27, which is adapted to house suitable locking mechanism for the purpose of securing a hand bag or similar article. Intermediate its ends the standard carries a hook 28 for the reception of a coat or cloak and a relatively small hook 29 for the reception of the handle of the hand bag. In addition there is located directly above the hook 28 a hollow arm 30 within which operates means for locking the coat or cloak upon the hook 28. If desired apertured ears 31 may be provided for the purpose of securing the hook upon a suitable support, these ears being shown in Figs. 1, 2 and 3, or openings 31 may be formed at the rear of the standard 25 for the reception of suitable securing devices.

The standard 25 is hollow throughout its length and at the juncture of the said standard and the arm 26, there is provided a substantially cylindrical enlargement 32, which is adapted to contain suitable mechanism for the operation of the locking means. The cylindrical enlargement 32 is open at both ends and threadedly engaging the opening at the rear end is a disk 33, which carries an inwardly projecting rod or arm 34 upon which is slidably mounted a hollow shank 35 of a plunger 36. The shank 35 has secured thereon near its inner end a collar 37, which is adapted to normally pass through a ring 38. This ring is positioned between spaced arms 39 mounted upon one face of a ring 40, the latter being positioned within the cylindrical enlargement 32 and held therein through the medium of a ring 41, the arms 39 being of sufficient length to contact with the inner face of the disk 33 so as to provide for holding and guiding the ring 38 in its movement. Positioned between the ring 38 and the disk 33 is a coiled spring 42, the tendency of this spring being to force the said ring and disk apart for a purpose later described. Secured to the shank 35 is a spring 43, which is adapted to enter an opening in the shank for engagement with the depression 44 in one edge of the guide rod 34 for the purpose of holding the plunger 36 yieldingly secured in its inner or retracted position. The ring 41 is provided with a peripheral groove 44, which is adapted to be engaged by a set screw 45 and a flange 46, the said screw engaging one of a plurality of spaced sockets 47 so that the said ring may be secured in any desired position within the front open end of the cylindrical enlargement 32.

The ring 38 is provided with diametrically disposed ears 49 and 50, the former being pivotally secured to a locking pin 51. The pin 51 is adapted to be projected through the end of the arm 26 for engagement with a pad 52 carried by a hat receiving member 53, the latter being provided with a flange 54 for threaded engagement with the outer open end of the arm 26. The hat receiving member 53 is formed of a pair of spaced disk like members so as to provide a slot or groove 55 for the reception of the rim of the hat, one of the members being provided with an aperture 56 for the passage of the pointed end of the locking pin 51, so as to permit the latter to engage the pad 52. Secured upon the outer face of the hat receiving member 53 through the medium of screws or fastening devices 57 is a curved hat rim engaging finger 58, which projects into the upper open end of the slot opening 55 for the purpose of engaging around the rim or sweat band of the hat. This member is illustrated in detail in Fig. 21 and includes the rim engaging hook 58 and a shank 59 by means of which it is secured to the outer face of the hat receiving member 53.

The spaced ears 50 of the ring 58 have secured therebetween a locking pin 60 which is adapted for longitudinal movement for the hollow arm 30. Threadedly engaging the outer end of the arm 30 is a nipple 61 which is provided with an opening for the passage of a guide 62, the latter being projected through the said opening by means of a spring 63 a sufficient distance to slightly space its outer end from a pad 64 located upon the curved extremity of the hook 28, so that when a coat or other article of wearing apparel is passed between the lower end of the arm and the curved end of the hook, the guide 62 may be pushed inward to permit of said passage.

In the operation of the device as so far described the spring 42 will act to force the ring 38 toward the ring 41, so as to project the pins 51 and 60 through the opening 56 and the guide 62 respectively for engagement with their respective pads. The pins may be simultaneously retracted by pushing inward the plunger 36, carrying with it the ring 38 and pressing the spring 42.

The pin 60 has pivotally secured thereto a rod 66, which extends downward through the hollow standard 25 and has secured to its lower end a member 67. This member is projected downwardly through the action of a spring 68 positioned between the said member and a disk or washer 69 positioned at the lower end of the hollow standard 25, or at the juncture of said standard and the hollow enlargement 27.

The enlarged portion 27 at the lower end of the standard 25 is cut away as shown at 70 and projecting inwardly from the lower edge of this cut away portion is a flange 71, which is adapted to coöperate with spring pressed projections 72 guided upon an extension 73 secured to the lower end of the standard. Springs 74 positioned between the projection 72 and the extension 73 act to force the said projection inward or toward the flange 71. The lower end of the member 67 is guided in a sleeve 75 and is adapted to engage one of a series of notches 76 provided upon the upper edge of the extension 72 and when in such engagement will prevent movement of the said extension. The engagement of the lower end of the member 67 with the extension 72 occurs through the movement of the ring 38 under the influence of the spring 42 and when this ring is moved inward against the action of the said spring the member 67 will be retracted to release the projection 72. The cut away portion 70 is adapted to receive the edge of the hand bag or satchel to which the lock is attached and the projection 72 is provided along its engaging edge with teeth or serrations 77 so as to prevent the unauthorized removal of the bag or satchel. The handle of the said bag or satchel is adapted to be placed upon the hook 29.

In order to hold the plunger 36 in its innermost position, there is pivotally mounted upon the cylindrical portion 32 a spring finger 78, the extremity 79 of which is adapted to engage an opening 80 in the enlarged or knob portion of the plunger.

Secured to the hanger through the medium of a chain 81 and an eye 82, is an umbrella or cane lock 83. This lock comprises plates 84 and 85 secured together by suitable fastening devices which pass through openings 86 in projection 87. The plate 84 is provided with grooves 85' and 86' for the reception of the ends of a substantially U-shaped flexible strap 87'. This strap is provided adjacent one end with an aperture 88 for the reception of a lug 89 carried by the plate 85, so that when the plates are assembled this end of the strap will be securely held therebetween. The plate 84 is also provided with a groove 90, which is adapted to receive one end 91 of a spring locking dog 92. This dog is adapted for engagement with teeth or serrations 93 formed upon the end of the strap opposite the end which carries the opening 88. When the serrated end is inserted within the slot 86', these serrations or teeth will be engaged by the dog 92 so as to prevent its withdrawal. This strap is adapted to take around the handle of the umbrella or cane in the form of a loop 94, the projection 87 of the plate 84 carrying a tooth 95 for engagement with the handle so as to prevent the latter from slipping through the loop. The dog 92 is provided with an extension 96 which is located adjacent an opening 97 in the plate 85, so that a key may be inserted in said opening and the said dog withdrawn from engagement with the teeth or serrations of the strap 87'.

The key which is used for the purpose of operating the lock 83 is adapted to be locked within the hanger simultaneously with the locking of the garments or other wearing apparel thereon and for this purpose there is provided a slot 98 located at the upper end of the notched portion 27. This key is shown at 99 and is secured to the hanger through the medium of a chain 100. The key 99 is provided with an aperture 101 which is adapted to receive one end 102 of the member 67 when the ring 38 is moved under the influence of the spring 42, the said key being released by the inward movement of this ring, so that all of the locking members of the hanger will be simultaneously released by the inward movement of the plunger 36.

As previously stated the disk 37 which is mounted upon the shank 35 of the plunger 36 is of a size to pass through the ring 38 and in order to provide an operative engagement between the disk and ring, there is provided a disk 103, the latter being utilized as a check to be retained by the person using the hanger. This disk is slotted as shown at 104 in Fig. 14 and is of a sufficient size to prevent its passage through the opening in the ring 38 when the said disk is placed upon the shank 35 of the plunger 36. The disk 103 has its slot 104 positioned upon the shank between the disk 37 and the ring 38, so that when the plunger is pushed inward the said ring will be moved inward against the action of the spring 42 and carry with it the pins 51 and 60 and the rod 66, so that all of the locking mechanism of the hanger will be simultaneously released. The disk 103 is provided around its periphery with a plurality of arcuate shaped radially disposed projections 105 and the ring 41 has its inner periphery similarly formed, the relative sizes of the inner periphery of the said ring and the outer periphery of the disk being such as to permit of the free passage of the latter through the former. By releasing the set screw 45 which secures the ring 41 in position, this ring may be rotated so that the projections 105 will not pass through the opening in the said ring and it will be necessary to provide a different disk for the operation of the lock. This is done by providing a disk whose slot 104 is disposed in proper relation. By this means the disk of one lock will not operate the disk of another lock.

If desired the hanger may be so constructed as to require the depositing of a coin for the purpose of operating the lock mechanism and by delivering a disk or check to the user. To accomplish this there is provided a casing 106, having a slot 107 so as to take over the standard 25. The casing is secured to the shank through the medium of fastening devices 107'. The upper end of the casing 106 is provided with a coin passage 108 opening at the side thereof. Carried by the knob of the plunger 36 is a spring detent 109 which is adapted to engage and pass through an opening in the upper wall of the coin passage 108 so as to be located in the path of the coin. The passage of the coin will disengage the detent 109 and permit the plunger to move forward or outward under the influence of the spring 42.

The casing 106 is provided with a front closure plate 110, which is provided with an opening 111 for the passage of the arm 30. The plate 110 is adapted to be securely locked in position through the medium of a spring actuated latch 112. This latch is operated through the medium of a detent 113 which is connected to a rock shaft 114, the latter being connected to the spring actuated latch 112 through the medium of rods 115. In order to operate the spring actuated latch to release the plate 110, a suitable key is inserted through the key opening 116 so as to rock the shaft 114 and withdraw the latch 112 from its engagement with the lug 117 secured to the bottom of the casing.

It is believed that when the foregoing description is read in connection with the accompanying drawings, that the construction, operation and advantages of the invention will be apparent.

This invention is susceptible of various changes in its form, proportions and minor details of construction and the right is reserved to make such changes.

Having described the invention, what is claimed is:—

1. A hanger of the class described, means carried thereby for supporting articles thereon, means including locking pins for holding the articles in position, a yieldably mounted ring connected to the locking pins, a plunger operating through the ring a slotted disk engageable with the shank of the plunger and held against longitudinal movement thereon for engagement with the ring to actuate the locking pins.

2. A hanger of the class described, means carried thereby for supporting articles thereon, means including locking pins for holding the articles in position, a yieldably mounted ring connected to the locking pins, a plunger operating through the ring, a peripheral notched and slotted disk engageable with the shank of the plunger, an inner peripheral notched ring positioned for the passage of said disk, the latter having its slot in position to permit of the passage of the disk through the ring for engagement with a yieldable ring to actuate the locking pins.

3. A hanger of the class described, means carried thereby for supporting articles thereon, means including locking pins for holding the articles in position, a yieldably mounted ring connected to the locking pins, a plunger operating through said ring, a peripheral notched disk engageable with the shank of the plunger, an inner peripheral notched ring and means for setting the ring to position the notches of the ring and disk so that the latter may pass through the ring in one position only to actuate the locking pins.

4. A hanger of the class described, means carried thereby for supporting articles thereon, means including locking pins for holding the articles in position, a yieldably mounted ring operatively connected to the locking pins, a plunger operating through the ring, a spring detent carried by the plunger, a slotted disk engageable with the shank of the plunger, a coin receptacle detachably secured to the hanger, means whereby a coin deposited within the receptacle will engage the spring detent and permit of the operation of the plunger to release the locking pins.

In testimony whereof I affix my signature.

OSCAR W. AHLGREN.